United States Patent [19]
Andra et al.

[11] 3,728,752
[45] Apr. 24, 1973

[54] BEARINGS FOR BRIDGES AND SIMILAR STRUCTURES

[75] Inventors: Wolfhart Andra, Stuttgart; Erwin Beyer, Dusseldorf; Fritz Leonhardt, Stuttgart; Heribert Thul, Bonn-Bad Godesberg; Louis Wintergerst, Esslingen Am Necarb, all of Germany

[73] Assignee: Gutehoffnungshutte Sterkrade Aktiengesellschaft, Oberhausen-Stekrade, Germany

[22] Filed: Feb. 22, 1971

[21] Appl. No.: 117,661

[30] Foreign Application Priority Data

Feb. 20, 1970 Germany..................P 20 07 767.2

[52] U.S. Cl............................................14/16
[51] Int. Cl. ..........................................E01d 19/06

[56] References Cited

UNITED STATES PATENTS

| | | | |
|---|---|---|---|
| 2,680,259 | 6/1954 | Milk | 14/16 |
| 3,390,854 | 7/1968 | Sherburne | 14/16 X |

FOREIGN PATENTS OR APPLICATIONS

| | | | |
|---|---|---|---|
| 1,202,813 | 10/0965 | Germany | 14/16 |
| 1,230,826 | 12/1966 | Germany | 14/16 |
| 1,157,640 | 11/1963 | Germany | 14/16 |
| 206,777 | 8/1966 | Switzerland | 14/16 |

*Primary Examiner*—Nile C. Byers, Jr.
*Attorney*—Toren & McGeady

[57] ABSTRACT

A slidable-tiltable bearing arrangement is comprised of a deformable resilient load transmitting bearing pad positioned within a casing which encloses the bottom and a part of the lateral surface of the pad. The upper bearing surface of the pad extends upwardly above the edge of the casing and a seal, preferably formed as a reinforced ring-shaped body of polytetrafluoroethylene, extends about and confines the upper edge of the pad against deformation. Further, the upper surface of the pad acts as a slide surface and depression or recesses are formed in it to hold a lubricant which aids in the sliding action. The casing may be formed with a separate side wall and base or the side wall and base may be formed as an integral member.

20 Claims, 6 Drawing Figures

Patented April 24, 1973

INVENTORS
WOLFHART ANDRÄ
ERWIN BEYER
FRITZ LEONHARDT
LOUIS WINTERGERST
HERIBERT THUL

BY Toren & McGeady

ATTORNEYS

BEARINGS FOR BRIDGES AND SIMILAR STRUCTURES

SUMMARY OF THE INVENTION

The invention relates to bearings for bridges and similar structures in which large sliding and tilting movements take place and, more particularly, it concerns a bearing member, such as a pad or cushion, for use in such a bearing which is positioned between an upper and a lower bearing plate, and is formed of a plastic and elastic material of natural or synthetic origin. Bearing constructions have been known such as designated in Germany as "Neotopflager" (pot-bearings), in which a bearing pad or cushion is enclosed within a steel pot. A lid or cover is inserted into the pot opening and rests on the pressure bearing surface of the bearing pad. This lid or cover projects across the upper rim of the pot for a small distance. Due to this projection, the slide surface of the bearing plate which rests on the cover, cannot contact the upper edge of the pot rim. Such bearings may be constructed in the form of slidable-tiltable bearings. In order to reduce the friction, the slide surface is often covered with a friction reducing coating of, for example, polytetrafluoroethylene (PTFE).

Slidable-tiltable bearings are known in which the tilting joint is formed by a rolling body (spherical segment), which is cylindrical or in the form of a ball or sphere, this tilting joint being mounted in a gliding or sliding manner on a steel plate. Inserts of PTFE or other low friction bearing materials are then arranged both in the curved and the plane slide surfaces to reduce the friction. Furthermore, so-called rubber layer bearings have previously been combined with PTFE slide bearings. In these combinations, the rubber layer bearing essentially makes the tilting movement possible.

It has been ascertained that these bearing combinations are less suitable where larger tilting angles under high pressure are present because considerable shearing forces occur in the bearing materials, such shearing forces relatively quickly cause damage and ultimately the destruction of the bearing.

Accordingly, it is the purpose of this invention to create a bearing for bridges and like structures which permits under high compressive pressures, large slide paths without resulting either in significant deformation of the bearing materials or significant shearing forces so that undesirable large restoring forces can be decreased.

Further, it is an object of the invention to provide a bearing of the indicated kind which, under the stated conditions, renders possible large tilting angles. Further large tilting angles are rendered possible under these conditions by the bearing while, nevertheless, the bearing has a very simple construction with only a few structural elements. Moreover, such a bearing should be suitable for the most varying applications without requiring any changes in its construction. Thus it may function as a point tilting bearing, as a linear slide-tilting bearing and also as a universal tilting bearing, while at the same time offering an insignificant resistance to moving and tilting.

Accordingly, the invention is concerned with a bearing for bridges and similar structures having a bearing pad which transmits the applied load and which consists of a plastic and elastic material of natural or synthetic origin, the bearing pad being surrounded laterally and at its base by a casing, the invention being characterized in that one of the two load transmitting pressure surfaces of the bearing pad projects above the lateral wall of the casing and, at the same time forms the sliding surface.

The invention constitutes, if compared to the prior art "Neotopf-bearings," a significant advance in the art due to the construction of the bearing, which is much simplified while the resistance to movement during tilting and sliding movements is significantly reduced.

The invention is based on the new realization that unexpectedly low friction forces occur if a smooth steel plate slides on the surface of a rubber elastic plate, for example, of neoprene.

In performed tests, the rubber-elastic plate was inserted, with the exception of a small projection, into a metal fitting or casing. The narrow gap between steel plate and fitting could be reliably sealed by narrow PTFE strips even for high pressures.

In this manner, it has been possible to produce the bearing pad or cushion from materials which do not have sufficient inherent form stiffness, which, however, due to their plasticity and/or elasticity are particularly suitable to permit large tilting angles.

According to a further feature of the invention, the casing consists thus of a laterally arranged cylindrical or polygonal ring or wall member and a bottom or base and is, at its open upper side, provided with a seal which bears against both the bearing pad and the counter sliding surface in sealing manner.

The construction and use of such a bearing pad as a direct slide surface for large slide and tilting movements at very large compressive forces has not been considered previously because highly plastic or highly elastic materials, which were subjected to stresses of the indicated kind, did not have sufficient form stiffness so that, from a practical point of view, there was always the danger that the bearing material would flow into the gap between the counter-slide surface and the rim of the pot wall. Accordingly, one would have been forced to choose this gap relatively small in order to keep the flowing of the material within acceptable limits. If it had been intended to enlarge the gap, then the flow of the bearing pad material would not be controllable in many instances, particularly with high compressive forces, and thus the shape of the bearing pad would have been changed or altered in an impermissible manner and the ability of the bearing to function effectively particularly for carrying out tilting movements, would no longer have been assured. Due to considerations, in the past industry has not made bearings of the nature here disclosed.

By constructing the bearing with a casing or housing which embraces the lateral sides and base of the pad and making the casing from a ring-shaped side member and a bottom member and by providing a form-stiff seal which surrounds the pad laterally and extends upwardly to the counter-slide surface, and further, by using highly plastic and highly elastic materials for the bearing pad, it has been possible to provide a bearing which has not been employed in the past. Accordingly, it is now possible to employ a novel kind of bearing which satisfies the most varying requirements.

Experiments have shown that by providing light lubrication of the roughened surface of a rubber-elastic plate with a fat-like special lubricant using test pieces of 20 cm diameter and compressive forces of 250 kp/cm$^2$, friction values were obtained which are still considerably below the corresponding values obtained with PTFE on steel.

The low friction values which are obtained in this arrangement may be explained essentially by the fact that the bearing plate of steel glides primarily on the thin film of lubricant, which film acts like a viscous liquid and is not displaced or dislodged due to the enclosure of the rubber elastic plate on all sides. Because of this arrangement each area of the slide surface is under the same pressure and any dislocation is avoided. Further, the lubricant penetrates into the roughened and somewhat porous surface of the rubber elastic plate and is retained there in such a manner that, even with repeated movements of the bearing plate of steel, it is not squeezed out laterally or dislodged to any significant degree.

According to an essential feature of the invention, one or both pressure surfaces of the bearing pad are provided with depressions for receiving a lubricant. Dependent on the size of the depressions which may be shaped as grooves or as circular or conical cavities or which may have a plate shaped profile, it is possible to store the requisite amounts of lubricant which upon shape changes of the pad is gradually dispensed. According to a further feature of the invention, also the counter surface of the slide material may be provided at the bearing plate with depressions for receiving lubricant. The same is possible at the bottom surface of the bearing pad.

In still another feature of the invention, the seal which embraces the bearing pad is provided with depressions at the surface which bears against the counter-slide surface. In this manner the pressure surfaces of the pad and of the seal which transmit the load and together form the slide surfaces, become smaller when the pressure surface of the pad bears against the pot bottom.

When a load is applied to the bearing, higher compressive forces occur in the pressure surface between seal and bearing plate, than in the pressure surface between pad and bearing plate. Due to the higher forces at the seal, the lubricant film on the pad, which is under a lesser pressure, is substantially prevented from escaping laterally, even if the slide movements are often times repeated.

At the same time, the slide friction in the seal surface can be reduced since the friction coefficient with PTFE decreases as higher pressures are applied.

During tilting movements of the bearing plate, the resistance of the bearing pad to deformation is the lowest if the pad, corresponding to the transverse expansion, can move, substantially unobstructed by friction forces, in a direction which is at right angles to the force direction.

The significant advantages of the invention are due to the fact that the rubber elastic material bearing pad, which is surrounded on all sides and is under pressure, also forms at the same time the slide surface for the bearing plate which is movable at right angle to the pressure direction. For this purpose, however, the pad must project somewhat beyond the wall of the casing and must be kept or maintained at the free rim or edge by a stiff seal which transmits the lateral pressure of the pad in the projecting region onto the pot wall. The seal glides during tilting movement of the bearing plate at the inner wall of the pot, and when slide movements take place, the seal slides at the counter-slide surface. PTFE has been found to be advantageous as material for the seal. This synthetic material may be made sufficiently stiff by suitable additives, and it may be reinforced by metal or other inserts. PTFE thus modified is still sufficiently deformable that the material, without damage to it, can be subjected to the distortions and deformations of the seal which occur during tilting movement. The slide friction at the slide surfaces of the inner wall of the pot and the lower surface of the bearing plate decreases the deformation resistance of the bearing which occur upon tilting and slide movements.

At the upper side of the bearing pad, only very slight friction forces occur in the inventive construction of the bearing. Transverse expansion is thus largely prevented without having to resort to additional measures. Further, in order to maintain the friction very low at the lower side of the bearing pad, it is advantageous to provide a slide layer at this location by means of a lubricant. If desired, the lubricant may also be stored in a suitable manner by profiling or shaping the lower surface of the pad.

When the bearing is subjected to large tilting angles, it is of particular importance that the casing is made of a ring-shaped side member and a bottom which embrace the bearing pad. The ring-shaped side member may bear against the bearing pad in a form fitting manner and/or it may be supported on the casing base or bottom. However, the ring may also be integrally attached to the bottom. If the side member is supported by the bearing pad, then means are arranged by which the side member bears on correspondingly or complementarily shaped surfaces or parts of the bearing pad. In this arrangement the shape of the pad may be such that the pressure surface of the bearing pad which bears against the counter surface is smaller than the pressure surface which bears against the bottom of the casing.

It is also possible to choose a construction such that the ring has interior conical or tapering surface portions by means of which the ring-shaped side member bears or supports itself on correspondingly shaped conical or tapering juxtaposed circumferential surfaces of the bearing pad. Further, it is possible to choose a configuration such that the ring-shaped side member with a portion of its inner surfaces, embraces the bottom at a portion of its outer surfaces. It is also feasible that, in reverse manner, the ring at a portion of its outer surfaces, is embraced by the inner surfaces of a wall of the bottom which is drawn upwardly.

In these various constructions the side member is capable of performing movements relative to the casing bottom. These movements may be simple axial movements. However, combined axial and tilting movements can also be rendered possible if a sufficiently large gap is provided between the side member and the bottom. This gap is then closed relative to the bearing pad by a seal member. Accordingly, a feature of the invention resides in that in the range of supporting elements between the side member and the bottom, there are provided sealing rings or the like which on the one side bear against the side member and on the other side bear sealingly against the bottom.

In this manner the highly plastic or highly elastic material of the bearing pad is prevented from being pressed into this gap and from negatively affecting the capability for movement of the bearing.

A modification of the construction of the bearing in accordance with the invention resides in that the bearing pad may be formed of two or more superimposed individual plates. In such case, the bearing pad can be covered on top or on top and bottom with thinner neoprene plates, whose surfaces which face the bearing plate or the pot bottom, are prepared for receiving and retaining the lubricant.

According to a still further embodiment of the invention, the counter surface of the slide material at the bearing plate and/or at the bottom can be provided with a friction reducing coating of metal or synthetic material. It is also possible to provide both pressure surfaces of the bearing pad with a friction reducing coating of synthetic material.

A particular advantage of the invention resides in the fact that the bearing does not require any cover above the bearing pad, such as it is known from the prior art "Neotopflager," previously referred to. Furthermore, welding for producing a one-piece closed pot is thus rendered unnecessary.

The great advantage of the inventive bearing as compared to the prior art construction, resides in the fact that the expensive PTFE bearing plates need not be used. The slide surface is ideally formed by the bearing pad proper, whereby at the same time any obstruction for the transverse expansion of the pad by friction in this surface is dispensed with. The bearing arrangement may be readily dimensioned so as to be suitable for all tilting angles which may occur in practice and for all slide displacements and applied loads. A substantially uniform compression area is assured by the inventive arrangement in the adjoining structural components. As a matter of fact, in respect to sliding and tilting movements, the inventive bearing may be considered tantamount to a pure liquid bearing. In the inventive construction of the bearing only very small friction forces occur at the upper side of the pad. Any obstruction of the transverse expansion is thus largely eliminated without requiring additional measures. Also at the lower side of the bearing pad the friction can be maintained within a very small range of values if, in accordance with the invention, a slide layer is provided by means of a lubricant. This lubricant, by suitably shaping the lower surface of the pad, may also be retained or stored as previously mentioned.

Due to the elimination of a cover, the structural height of the bearing is also much less than in the known "Neotopflagern." The two tasks of a bearing, to wit, to render possible sliding and tilting movements and to transmit loads, are solved in a superior manner in the inventive construction without requiring, as in the prior art, the combination of two bearings, that is, a tilting bearing and a slide bearing, but by combining both functions in the inventive bearing pad arrangement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 3:
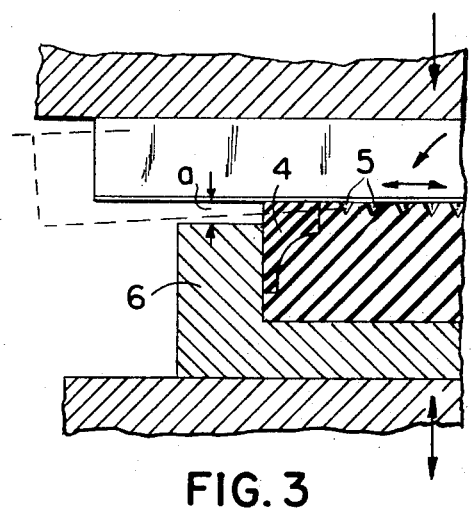
FIG. 3 is a section similar to that in FIG. 1, displaying another embodiment of the invention.

In the different figures of the drawing similar elements are identified by the same reference numerals.

Figure 1:
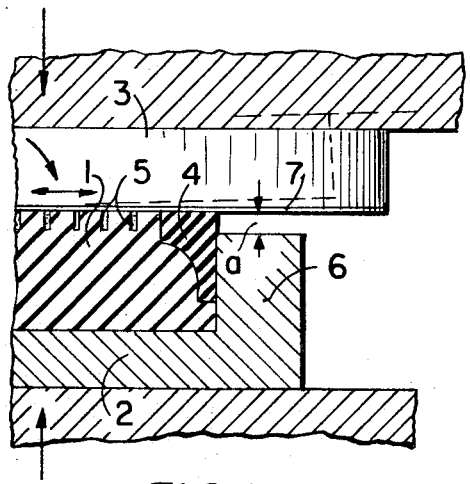
FIG. 1 is a section through a slidable-tiltable bearing, embodying the present invention.

In the embodiment according to FIG. 1, the bearing pad 1 consists of a rubber elastic material which is deformable and resilient for example, neoprene. The bearing pad 1 is inserted into a casing or housing which consists of the ring-shaped side wall 6 and a base or bottom wall 2. The upper surface of the pad 1 projects above the upper edge of the side wall 6. At the height or distance a the counter slide surface 7 of a bearing plate 3 shown in dashed lines in FIGS. 2 and 4 slides on the upper surface of the pad. The bearing pad 1 is provided with recesses or depressions 5 in its upper surface which are filled with lubricant. The counter slide surface 7 of the bearing plate 3 has, in order to reduce the friction, a smooth coat of metal or synthetic material which also serves as a corrosion resisting coating.

The gap a between the upper edge of the side wall 6 and the bearing plate 3, is closed relative to the bearing pad 1 by means of a ring-shaped seal 4. The height of the gap a and thus the amount of the lateral projection of the bearing plate 3 is dependent on the size of the tilting angle and or the slide path. In FIG. 1, the position of the bearing plate 3 is shown in dash lines during a tilting and sliding movement.

Figure 4:
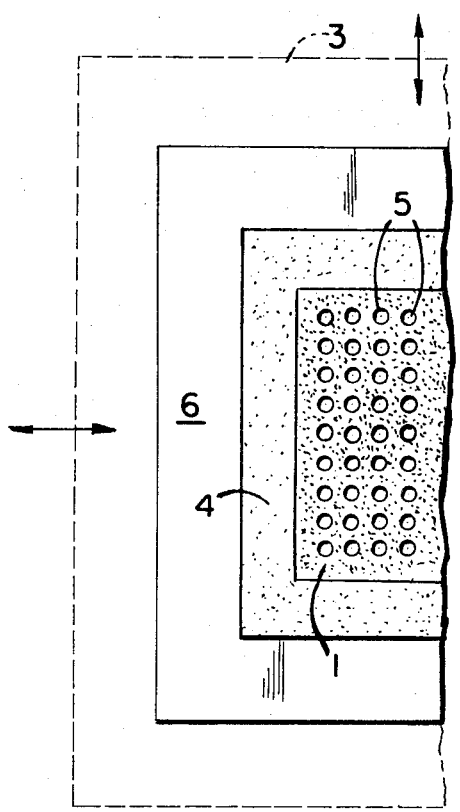
FIG. 4 is a plan view similar to the one in FIG. 2 of the bearing shown in FIG. 3 with the bearing plate shown in dashed lines.
Figure 2:
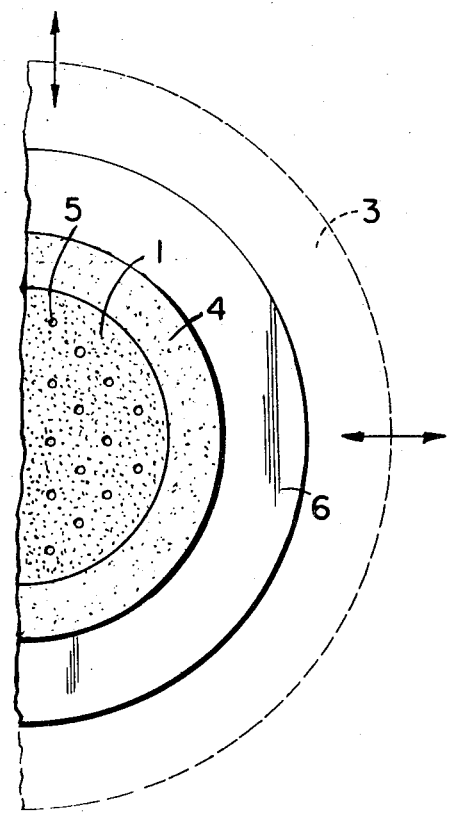
FIG. 2 is a plan view of the bearing illustrated in FIG. 1 with the bearing plate removed and shown in dashed lines.

The plan view shape of the bearing may be chosen in any desired manner. For example, it may be round, as shown in FIG. 2, or it may be rectangular, as indicated in FIG. 4.

Figure 5:
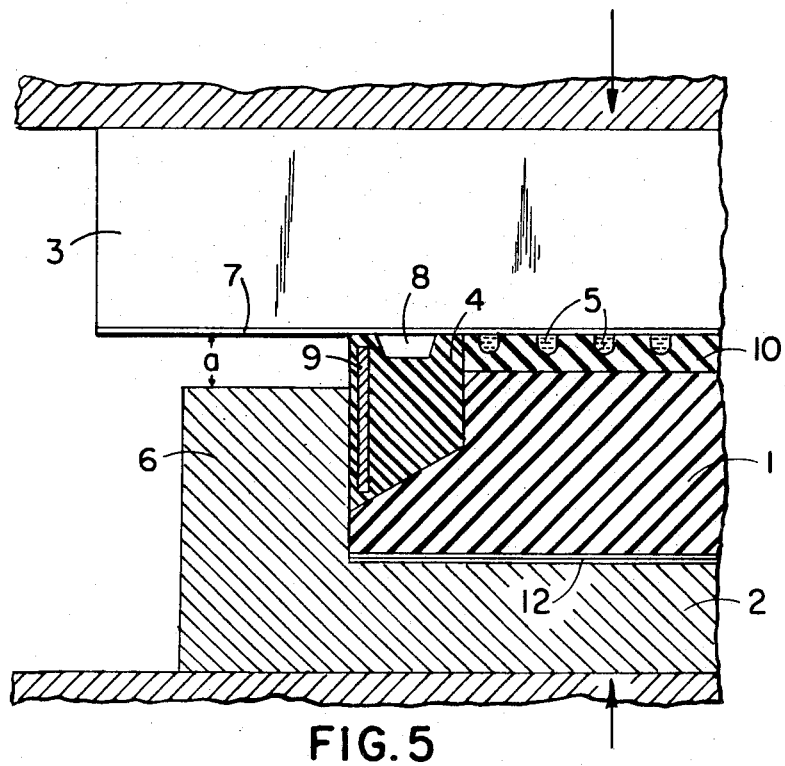
FIG. 5 is a partial sectional view through a modified embodiment of the bearings illustrated in FIGS. 1 or 3.

The size of the gap a between the bearing plate 3 and the upper edge of the ring-shaped side member 6 has to be chosen correspondingly large for larger tilting angles. The seal 4, which serves to bridge the gap a, which seal is, for example, made of PTFE, can be reinforced by metal inserts 9, such as are shown in FIG. 5. Instead of metal, the inserts 9 may be formed from glass fibers or fabrics, synthetic materials of great stability and the like. Further, a plurality of inserts 9 can be used, arranged in side-by-side relationship.

In the bearing of FIG. 3, the bearing pad 1 consists of a rubber elastic material, for example neoprene, and is also inserted into a casing or housing consisting of a ring-shaped side wall and a base or bottom 2. The surface of the bearing pad 1 projects above the upper edge of the side wall 6 for a height or distance $a$ and is covered by the counter slide surface 7 of the slide material of the bearing plate 3 which glides on the upper surface of the pad. The bearing pad 1 is provided with cone-shaped depressions 5 which are filled with lubricant. In order to reduce friction, the counter slide surface 7 of the bearing plate 3 has a smooth coating of metal or plastic material which at the same time serves as protection against corrosion.

In order to bridge the gap $a$ between the upper edge of the ring and the counter slide surface 7 of the bearing plate 3, there is provided the seal 4 composed of synthetic material. The extent of the projection height or distance $a$ of the bearing pad 1 is dependent on the size of the tilting angle and the slide path. The seal 4, which bridges the gap $a$ is made of, for example, PTFE and is reinforced by one or several metal inserts. Instead of metal, the inserts 9 may be made from glass fibers or fabric, synthetic materials of high stability and the like. The inserts may be arranged in a side-by-side relationship.

In order to increase the contact pressure between the counter slide surface and the seal 4, the latter is provided with depressions 8, see FIG. 5.

In FIG. 5 a bearing pad 1 is shown which is made of two superimposed pad plates 1, 10. The upper, thinner pad or cushion plate 10, is provided with depressions 5 for receiving lubricant.

In order, during a tilting movement, to obstruct the deformation of the pad 1 by friction against the pot bottom 2 as little as possible, there is provided a lubricant layer or a PTFE plate 12 (see FIGS. 5 and 6) between the bottom 2 of the casing and the lower surface of the bearing pad 1.

With larger tilting angles, the seal 4 may not be sufficient, even if it includes reinforcing inserts if the size of the gap $a$ exceeds certain dimensions. As distinguished from the unitary casing in FIG. 1-4, the side wall 6 in such instances of larger tilting angles is formed as a separate member in such a manner that, relative to the separate bottom 2, the side wall can perform certain movements within certain limits (see FIG. 6). In this manner it is possible for the side wall 6 to follow partially the tilting movements of the bearing plate 3. To afford this limited movability of the ring-shaped side wall 6 relative to the bottom 2, a gap 14 (see FIG. 6) is provided between the outer circumference of the bottom and the side wall 6. In these instances, a seal member 11 is positioned between the bottom and the side wall such that it effectively closes the gap 14 during the movements of the ring 6 relative to the pad 1.

Figure 6:
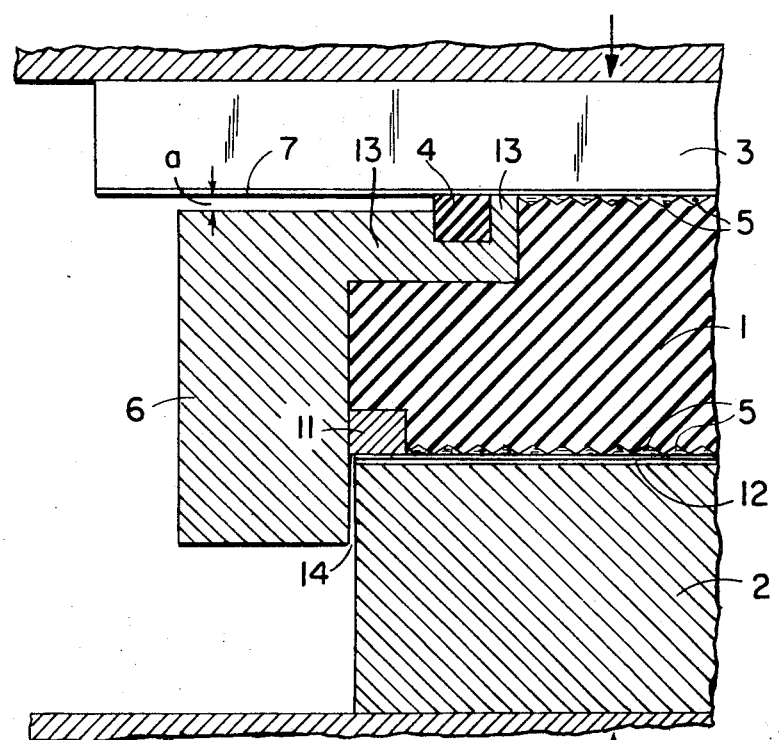
FIG. 6 is a partial sectional view, similar to FIG. 5, of another slidable-tiltable bearing in accordance with the present invention.

According to FIG. 6, the ring-shaped side wall 6 is provided with an inwardly directed supporting ledge 13 about its upper edge by means of which the side wall engages or supports itself on the bearing pad 1. The seal 4 is inserted in part into the supporting ledge 13 and, as a result, the side wall 6 is fixed relative to the bearing plate 3 in the vertical direction. The seal 4 which, in the direction of applied force is under higher pressure than the pad, serves as spacer.

If PTFE is used as the material for the seal 4, the higher contact pressure is particularly advantageous since in this manner the friction value will be smaller. In the horizontal direction, the side wall 6 is fixed by the bottom 2 which is pushed somewhat inwardly.

The upper surface of the bottom 2, as seen in FIG. 6, is provided with a friction-reducing coating 12. The pad 1 is profiled at its upper and lower surfaces for the purpose of receiving lubricant.

While a specific embodiment of the invention has been shown and described in detail to illustrate the application of the inventive principles, it will be understood that the invention may be embodied otherwise without departing from such principles.

What is claimed is:

1. A bearing arrangement for a bridge and similar structures comprises a load transmitting bearing pad formed of a deformable resilient material and has an upper bearing surface and a lower bearing surface, and means enclosing at least a portion of said bearing pad including the lower bearing surface and at least a portion of the lateral surface of said bearing pad extending between the upper and lower bearing surfaces, wherein the improvement comprises that said means includes a base member located below and in bearing contact with the lower bearing surface of said bearing pad and a ring-shaped side wall member extending upwardly from said base member, said side wall member having an inwardly facing upwardly extending surface and at least a portion of the inwardly facing surface arranged in contact with a portion of the lateral surface of said bearing pad, the upper bearing surface of said bearing pad is located upwardly above the upper end of said side wall member and forms a sliding surface for the bearing arrangement, an upwardly extending ring-shaped form-stiff seal enclosing the lateral upper edge of said bearing pad and said seal having its upper surface located in the plane of the upper bearing surface of said pad and said seal having lateral surfaces extending downwardly therefrom to a plane located below the upper end of said side wall member with the outer lateral surface of said seal disposed in contact with the inwardly facing surface of said side wall member so that the upper surface of said seal and the upper bearing surface of said bearing pad are arranged to bear against the lower slide surface of a superposed bearing plate, and the lateral surface of said seal in contact with the inwardly facing surface of said side wall member having a dimension in the upward direction which is greater than the dimension between the upper end of said side wall member and the plane containing the upper bearing surface of said bearing pad and the upper surface of said seal.

2. A bearing arrangement, as set forth in claim 1, characterized in that said side wall has a cylindrical configuration.

3. A bearing arrangement, as set forth in claim 1, characterized in that said side wall has a polygonal configuration.

4. A bearing arrangement, as set forth in claim 1, characterized in that at least one of the upper and lower bearing surfaces of said bearing pad has depressions formed therein for receiving a lubricant which aids in the sliding action on the bearing surfaces.

5. A bearing arrangement, as set forth in claim 1, characterized in that the upper surface of said seal located in the plane of the upper surface of said bearing plate has depressions formed therein.

6. A bearing arrangement, as set forth in claim 1, characterized in that said seal is formed of a reinforced deformable resilient material sufficient for laterally containing said bearing pad.

7. A bearing arrangement, as set forth in claim 6, characterized in that said seal is formed of polytetrafluoroethylene.

8. A bearing arrangement, as set forth in claim 6, characterized in that at least one reinforcing insert disposed within said seal for assisting in retaining the upper portion of said bearing pad extends upwardly above said side wall within said seal.

9. A bearing arrangement, as set forth in claim 1, characterized in that said side member is disposed in form fitting engagement with the lateral surface of said bearing pad and said seal.

10. A bearing arrangement, as set forth in claim 9, characterized in that said side wall is integrally attached to and extends upwardly from said bottom member.

11. A bearing arrangement, as set forth in claim 9, characterized in that said side wall is separate from said bottom member and extends from a location below the lower bearing surface of said bearing pad to a location adjacent to and below the upper bearing surface of said bearing pad.

12. A bearing arrangement, as set forth in claim 11, characterized in that a step is formed about the circumferential upper edge of said bearing pad forming a shoulder spaced below the upper bearing surface of said bearing pad, and a ring-shaped ledge secured to and extending inwardly from said side wall and bearing on said shoulder formed by the step in said bearing pad.

13. A bearing arrangement, as set forth in claim 12, characterized in that the area of said upper bearing surface of said bearing pad is smaller than the area of the lower bearing surface of said bearing pad.

14. A bearing arrangement, as set forth in claim 11, characterized in that a seal member is disposed between and in sealing engagement with a portion of the inner surface of said side wall and a portion of the outer edge of the upper surface of said bottom member for providing a seal between said separate side wall and bottom member.

15. A bearing arrangement, as set forth in claim 14, characterized in that said seal located between said side wall and said bottom member is in sealing engagement with the adjacent surfaces of said bearing pad.

16. A bearing arrangement, as set forth in claim 1, characterized in that said bearing pad comprises a lower plate-like member and a superposed upper plate-like member which has a thickness less than the thickness of said bottom plate-like member.

17. A bearing arrangement, as set forth in claim 1, characterized in that an upper bearing plate is in engagement with the upper bearing surface of said bearing pad, a lower bearing plate being in contacting engagement with the lower bearing surface of said bearing pad, and a friction-reducing coating being deposited on each of the surfaces of said upper and lower bearing plate.

18. A bearing arrangement, as set forth in claim 17, characterized in that said friction-reducing coating is formed of a metallic material.

19. A bearing arrangement, as set forth in claim 17, characterized in that said friction-reducing coating is formed of a synthetic plastic material.

20. A bearing arrangement, as set forth in claim 1, characterized in that at least one of the upper and lower bearing surfaces of said bearing pad has a friction-reducing coating of synthetic plastic material formed thereon. characterized in that said seal is formed of polytetrafluoroethylene.

* * * * *